May 1, 1951  J. A. DAWSON  2,551,366

INDUSTRIAL HANDLE FOR JACOB'S CHUCK KEY

Filed April 27, 1948

INVENTOR.
Joseph A. Dawson
BY
Atty.

Patented May 1, 1951

2,551,366

UNITED STATES PATENT OFFICE 2,551,366

INDUSTRIAL HANDLE FOR JACOB'S CHUCK KEY

Joseph Arthur Dawson, Portland, Oreg.

Application April 27, 1948, Serial No. 23,527

1 Claim. (Cl. 81—177)

My invention pertains to industrial tools, and relates particularly to a handle for detachably securing a chuck key thereto.

Straight shank drills, as commonly employed in drill presses and similar machines, are held therein by means of jaws forming a part of the well-known drill chuck, known as a Jacob's chuck. The jaws are retractable, being cam operated by means of a rotating sleeve. This sleeve is provided at its lower edge with a circular gear rack which is engaged by the teeth of a pinion forming a part of a chuck key by means of which the jaws of the chuck may be firmly engaged with or retracted from the shank of the drill. It frequently occurs that greater purchasing power on the handle of said key is required to force the jaws into non-slipping engagement with the drill shank in order to prevent abrading the drill held by the chuck. The transverse T-handle generally provided on such keys provides inadequate purchase, and it is common practice to hammer upon the handle in an effort to produce a tighter grip of the chuck jaws upon the shank of a drill. Such procedure is undesirable, for the handles become bent, or flattened, or otherwise injured and said hammering produces damage to the chuck and the parts of the drill associated therewith.

It is a principal object of my invention to provide a chuck key handle in which a cup-shaped cavity is formed for receiving the hub of said engaging pinion and through which cavity and hub extends a retractible pin for releaseably securing the engaging pinion in said handle.

Another object is to provide a chuck key handle in which the engaging pinion is detachably mounted, and by which sufficient purchasing power may be provided for tightening the jaws of the chuck.

Other objects and advantages of my invention will appear from the following detailed description taken in connection with the accompanying drawing, in which.

Figure 1:
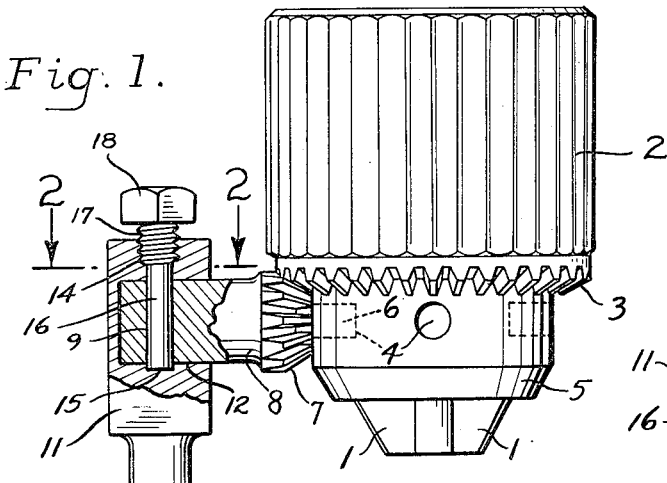
Fig. 1 is a side elevation, parts being shown broken away, illustrating the features of a drill chuck key handle embodying my invention.
Figure 2:
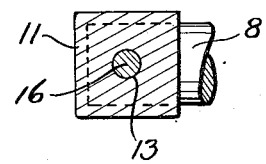
Fig. 2 is a fragmentary sectional view taken along the lines 2—2 of Fig. 1.
Figure 3:
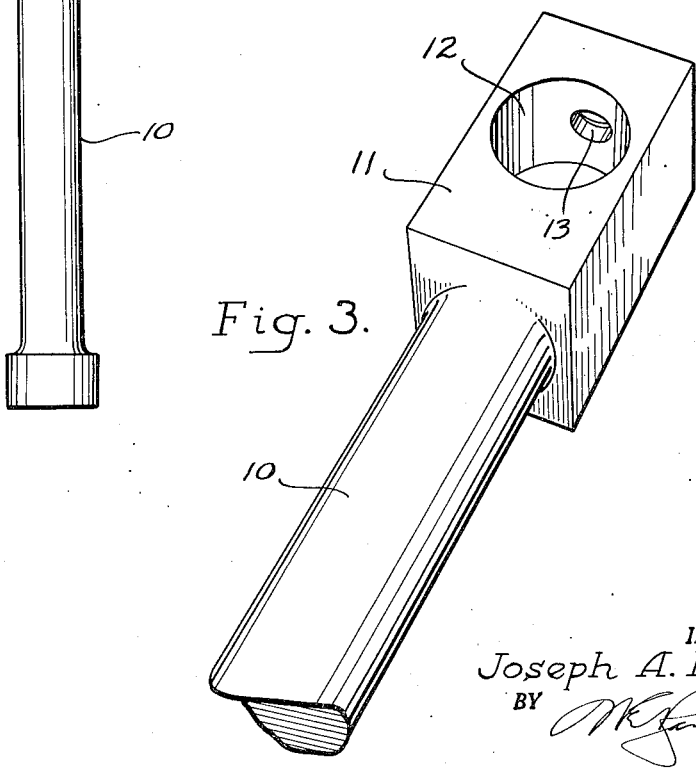
Fig. 3 is a fragmentary perspective view of the chuck key handle showing the head portion thereof with the engaging pinion and locking pin removed.

The drill chuck illustrated in the drawing is of the type previously described. Retractable jaws 1 are cam operated by manual rotation of sleeve 2. For greater turning power, the sleeve is provided with a circumferential gear rack 3 formed about the lower edge thereof. Spaced pilot holes 4 are formed in a stationary jaw holder 5 for receiving a pilot pin 6 extending outwardly from a pinion gear 7 formed in one end of a shank 8 of the chuck key. The key shank is provided with a transverse bore 9 which ordinarily receives a bar which serves as a T-handle for said key, as explained hereinabove.

The handle of the present invention comprises a handle shank 10 provided at one end with a head 11 in which a cup-shaped cavity 12 is formed. The cavity may be of cylindrical shape as shown, or squared, depending upon the shape of the key shank or pinion hub to be received therein. The cavity extends outwardly of said head in a direction normal to the longitudinal axis of the handle shank. A laterally disposed hole 13 extends through said head bisecting the cavity normal to the axis of said cavity and in axial alignment with the handle shank 10. Threads 14 are formed in the outer portion of said hole. Diametrically opposite the threaded hole 13 is a recess 15 which serves as a seat for the end of a locking pin 16. This pin is provided with threads 17 located adjacent a non-circular engageable head 18.

In operation, the shank or hub 8 of the pinion 7 is inserted in the cavity 12 and the shank bore 9 is aligned with the hole 13 and recess 15 of the handle. The locking pin 16 is then inserted through the hole 13 and shank bore 9, and secured therein by turning the pin by means of the head 18, thereby engaging the threads 14 and 17. The end of the pin is received in the recess 15 to prevent lateral displacement of the chuck key. The key may be removed from the handle by reversing the above procedure. It will be apparent to those skilled in the art that the above described handle may be used with industrial tools other than the chuck key which has been described hereinabove.

I claim:

A handle for receiving the apertured cylindrical hub of a standard chuck key, comprising an elongated cylindrical shank defining a handle grip portion, a flat-sided head carried at one end of said shank, said head having a rectangular cross section with the long axis of the rectangle aligned with the axis of said elongated cylindrical shank, a cylindrical cavity in said head open to one of the flat sides thereof and extending normal to the axis of said shank, a hole piercing said head in axial alignment with the axis of said shank and communicating with said cavity, said hole being smooth bored over the portion adjacent said cavity and carrying screw threads in the portion remote from said cavity, a cylindrical recess in said head communicating with said cavity and axially aligned with said hole, said cylindrical cavity having a closed end wall spaced laterally from the axis of said hole and recess a distance substantially equal to the spacing of the aperture axis and terminal end of a standard chuck key whereby said aperture, hole and recess all are aligned when said terminal end rests against said closed end wall, and an elongated locking pin having a smooth cylindrical shank complementary to the smooth bore of said hole and carrying screw threads adjacent one end thereof, said pin extending through said hole, the aperture in said hub, and into said recess releasably to secure said cylindrical hub in said cylindrical cavity.

JOSEPH ARTHUR DAWSON.

REFERENCES CITED

The following references are of record in the file of this patent:

UNITED STATES PATENTS

| Number | Name | Date |
| --- | --- | --- |
| Re. 20,445 | Newmark | July 13, 1937 |
| 751,635 | Gustafson | Feb. 9, 1904 |
| 2,012,147 | Stoner | Aug. 20, 1935 |
| 2,396,922 | Magnenat | Mar. 19, 1946 |

FOREIGN PATENTS

| Number | Country | Date |
| --- | --- | --- |
| 775,536 | France | Oct. 15, 1934 |